(12) United States Patent
Liu et al.

(10) Patent No.: US 6,434,139 B1
(45) Date of Patent: Aug. 13, 2002

(54) METHOD FOR OPTIMIZING MOBILE WIRELESS COMMUNICATIONS ROUTED ACROSS PLURAL INTERCONNECTED NETWORKS

(75) Inventors: Chung-Zin Liu; Kenneth Wayne Strom, both of Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/371,385

(22) Filed: Aug. 10, 1999

(51) Int. Cl.$^7$ ............................................... H04L 12/66
(52) U.S. Cl. ........................ 370/352; 370/310; 704/212
(58) Field of Search ............................ 370/310, 310.1, 370/311, 328, 346, 466, 401, 467, 522, 352, 353, 354, 355, 356; 704/501, 500, 212; 455/432, 433, 445, 426

(56) References Cited

U.S. PATENT DOCUMENTS

| | | | | |
|---|---|---|---|---|
| 6,112,084 A | * | 8/2000 | Sicher | 455/426 |
| 6,256,612 B1 | * | 7/2001 | Vo | 704/500 |
| 6,307,845 B1 | * | 10/2001 | Hummelgren | 370/328 |
| 6,314,284 B1 | * | 11/2001 | Patel | 455/417 |
| 6,317,609 B1 | * | 11/2001 | Alperovich | 455/556 |
| 6,327,267 B1 | * | 12/2001 | Valentine | 370/466 |

FOREIGN PATENT DOCUMENTS

| | | | | |
|---|---|---|---|---|
| EP | 0 783 217 | 7/1997 | ............ | H04L/12/46 |
| WO | WO 96 42176 A | 12/1996 | ............ | H04Q/7/30 |

OTHER PUBLICATIONS

Liao W: "Mobile Internet Telephony Mobile Extensions to H.323" Proceedings IEEE infocom. The conference on computer communications, US, New York, NY:IEEE, Mar. 21, 1999, pp. 12–19.

* cited by examiner

*Primary Examiner*—Douglas Olms
*Assistant Examiner*—Ricardo M. Pizarro
(74) *Attorney, Agent, or Firm*—Walter W. Duft

(57) ABSTRACT

A telecommunication system routs real-time information traffic from an originating digital radio unit served by an originating network to a terminating unit served by a terminating network via an intermediate network interconnecting the originating and terminating networks. The originating digital radio unit has an encoder/decoder (e.g., a vocoder) for generating digital wireless frames from information that is input thereto. The originating network includes an originating node with an encoder/decoder for performing wireless-specific conversion of the digital wireless frames to digital wireline (e.g., PCM) traffic. The intermediate network includes an originating-end interface node with an encoder/decoder for compressing the digital wireline traffic for transport across the intermediate network. Optimization of communications routed between the originating and terminating units is achieved by routing the digital wireless frames without wireless-specific conversion being performed at the originating node of the originating network nor compression conversion being performed at the originating-end interface node of the intermediate network, such that the rate of information traffic throughput is maximized.

19 Claims, 3 Drawing Sheets

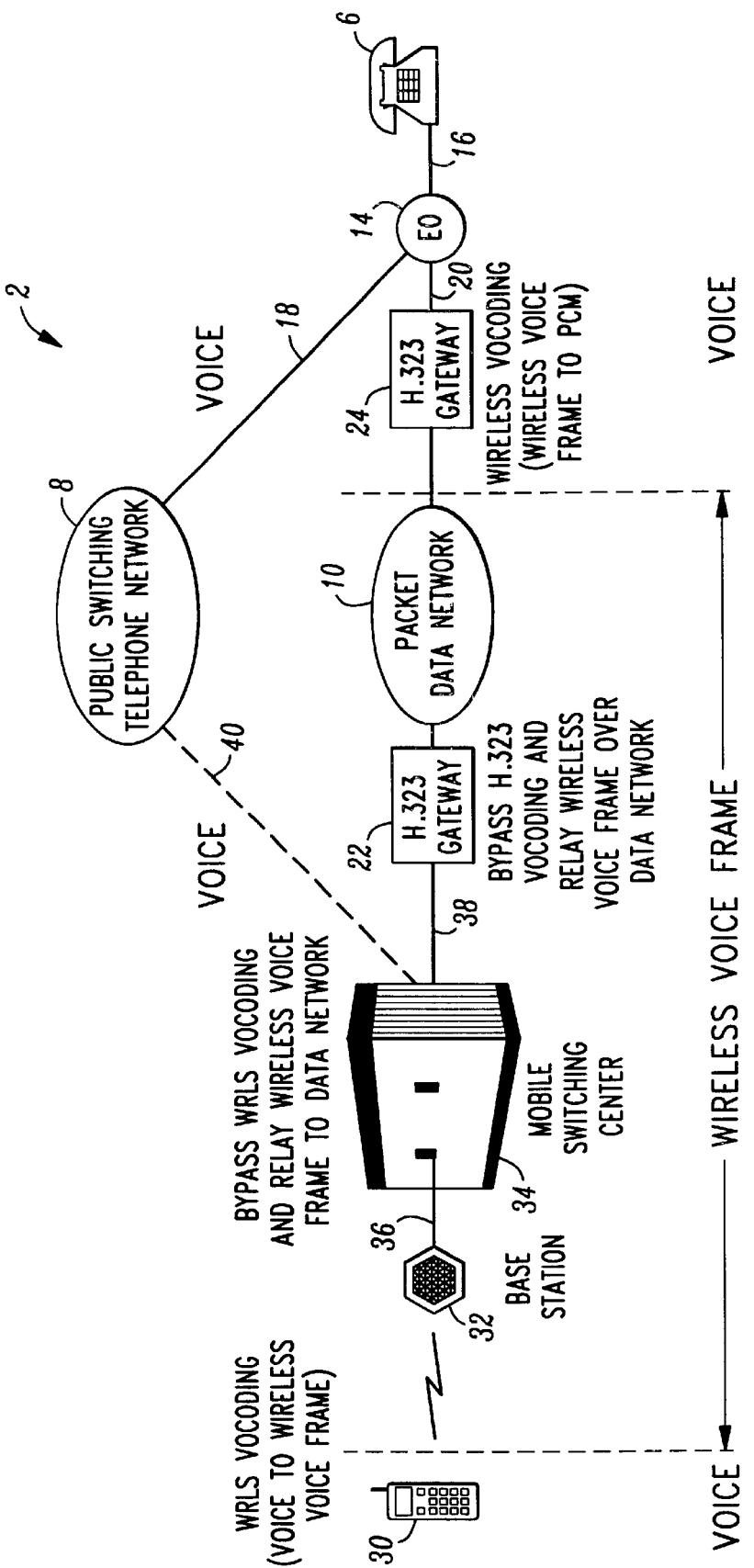

METHOD FOR OPTIMIZING MOBILE WIRELESS COMMUNICATIONS ROUTED ACROSS PLURAL INTERCONNECTED NETWORKS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to wireless communications, including mobile wireless communications over cellular telephone systems. The invention further relates to real-time (e.g., voice, multimedia, etc.) communications across multiple networks. More particularly, the invention concerns a method for optimizing real-time communications routed from one mobile wireless unit to another, or from a mobile wireless unit to a wireline unit, across plural interconnected networks, and especially between a circuit-oriented voice network and a data network implementing connectionless network layer datagram routing.

2. Description of the Prior Art

Considerable attention has been directed toward the implementation of real-time communication across computer data networks, and particularly the ability to route voice traffic to and from the Public Switched Telephone Network (PSTN). There has been related interest in using so-called Voice over IP (VoIP) solutions to facilitate voice communication between originating and terminating PSTN end points, using the Internet for long haul routing while substantially bypassing the PSTN. Similar proposals have been made for routing voice traffic as ATM packets over Asynchronous Transfer Mode (ATM) networks (VoATM).

Traditionally, voice calls are transported entirely over the end-to-end, circuit-based PSTN. For PSTN bypassing applications, it has been proposed that PCM voice traffic be processed into IP (or ATM) packets, transported over the Internet (or ATM network), and then processed back to PCM voice. To facilitate such call routing, the originating and terminating End Office (EO) switches can be connected to PSTN/IP (or PSTN/ATM) gateways that reside as hosts on the IP (or ATM) network. Based on the called number or other signaling indicator, the EO switches route certain calls through the IP (or ATM) gateways instead of the PSTN.

It would be desirable if the foregoing VoIP topology could be used by mobile wireless telephone subscribers as well as wireline users. For example, a wireless gateway interconnecting a Mobile Switching Center (MSC) and an IP or ATM network would enable wireless traffic to be routed outside of the PSTN. However, inefficiencies would be introduced due to the delays inherent in wireless environments. These delays are particularly acute in digital wireless systems where voice encoder/decoders (vocoders) in the mobile radio units are used to digitize (and compress) analog voice signals of fixed duration (e.g., 20 ms). The sampled input is converted into corresponding digital wireless frames for air interface transmission according to a wireless-specific vocoding standard, such as one of the algorithms for TDMA (Time Division Multiple Access), CDMA (Code Division Multiple Access) or GSM (Global System for Mobile Communications) mobile networks. A receiving-end vocoder in the MSC (or in a Base Station (BS)) decompresses the digital wireless frames and converts the information into digital wireline traffic in accordance with an uncompressed encoding format such as PCM (Pulse Code Modulation). If the PCM traffic is routed to an originating PSTN/IP gateway for transmission across the Internet, vocoding would typically again be performed to compress the information for improved IP transport efficiency. The terminating PSTN/IP gateway would then reconvert the compressed information into uncompressed PCM traffic to be sent to the terminating EO. In all, there would be four vocoding steps for every transmission between a mobile wireless unit and a remote wireline unit. If the remote unit is another mobile wireless unit, there would be six vocoding operations performed. The delays produced by these vocoding operations may be unacceptable to users.

Accordingly, there is a need in a mobile wireless communication system for a method of optimizing voice or other real-time wireless communications routed across plural interconnected networks without the above-described inefficiencies. What is required is a communication method that eliminates the overhead associated with repeated encoding/decoding (e.g., vocoding) steps so as to improve call throughput efficiency and minimize transmission delays.

SUMMARY OF THE INVENTION

A method for optimizing mobile wireless communication across plural interconnected networks provides a novel solution to the foregoing problem. In accordance with the inventive method, a telecommunication system routes real-time information traffic from an originating digital radio unit served by an originating network to a terminating unit (which could also be a digital radio) served by a terminating network, via an intermediate network that interconnects the originating and terminating networks. The originating and terminating networks could be one and the same, or they could be independent networks. The intermediate network could be any suitable telecommunication network. The originating digital radio unit communicates with the originating network via an originating node. This originating node, in turn, communicates with an originating-end interface node in the intermediate network. These nodes would typically be situated remotely from each other, but could also be co-located. The terminating unit communicates with the terminating network via a terminating node. This terminating node, in turn, communicates with a terminating-end interface node in the intermediate network. Again, these nodes could be co-located together or situated remotely from each other.

The originating digital radio unit has an encoder/decoder (e.g., a vocoder) for generating digital wireless frames from information input to the radio unit. The originating node of the originating network contains an encoder/decoder for converting the digital wireless frames into digital wireline, e.g., PCM, traffic. The originating-end interface node of the intermediate network contains an encoder/decoder for converting the digital wireline traffic received from the originating node of the originating network into compressed digital wireline traffic. Optimization of communications routed between the originating radio unit and the terminating unit is achieved by routing the former unit's digital wireless frames without further encoding or decoding through at least the originating node of the originating network, and preferably through both the originating node of the originating network and the originating-end interface node of the intermediate network, such that the rate of information traffic throughput is maximized.

In preferred embodiments of the invention, the originating and terminating networks are part of a single telephone network, such as the PSTN, and the intermediate network is a computer data network that routes information using a network layer datagram protocol such as IP, a link layer protocol such as ATM, or both. The originating node in the originating network is preferably a cellular network MSC or MSC/BS combination (if vocoding is performed at the BS). The terminating node in the terminating network is preferably a terminating EO serving a terminating wireline unit, or a cellular network MSC or MSC/BS combination serving a terminating wireless unit. The originating-end and terminating-end interface nodes of the intermediate network are preferably network gateway platforms implementing a multimedia protocol such as H.323 or any other suitable standard. The originating MSC and the terminating EO or MSC would typically connect thereto via T1 or E1 trunks carrying time division-multiplexed digital wireline traffic.

When the digital wireless frames transmitted by the originating digital radio unit are received at the originating BS or MSC, the usual wireless-specific conversion into digital wireline traffic is not performed. Instead, the digital wireless frames are routed to the originating network gateway. The usual compression conversion performed at the originating network gateway is also eliminated and the digital wireless frames are encapsulated into network datagram packets for routing to the terminating network gateway. It is at the latter gateway that the second wireless-specific encoding/decoding operation is preferably performed to convert the digital wireless frames into digital wireline frames. These digital wireline frames are routed onto the trunk extending between the terminating network gateway and the terminating EO or MSC. At the terminating EO or MSC, the digital wireline frames can be further processed depending on the nature of the terminating unit, (i.e., whether it is a wireless or wireline, digital or analog device).

BRIEF DESCRIPTION OF THE DRAWING

The foregoing and other features and advantages of the invention will be apparent from the following more particular description of a preferred embodiment of the invention, as illustrated in the accompanying Drawing, in which:

FIG. 3 is a block diagram showing a second exemplary telecommunication system, incorporating the method of the present invention, for routing telephone calls from a wireless subscriber to a wireline subscriber in the PSTN across an interconnected data network.

DETAILED DESCRIPTION OF THE PREFERRED EMBODIMENT

Figure 1:
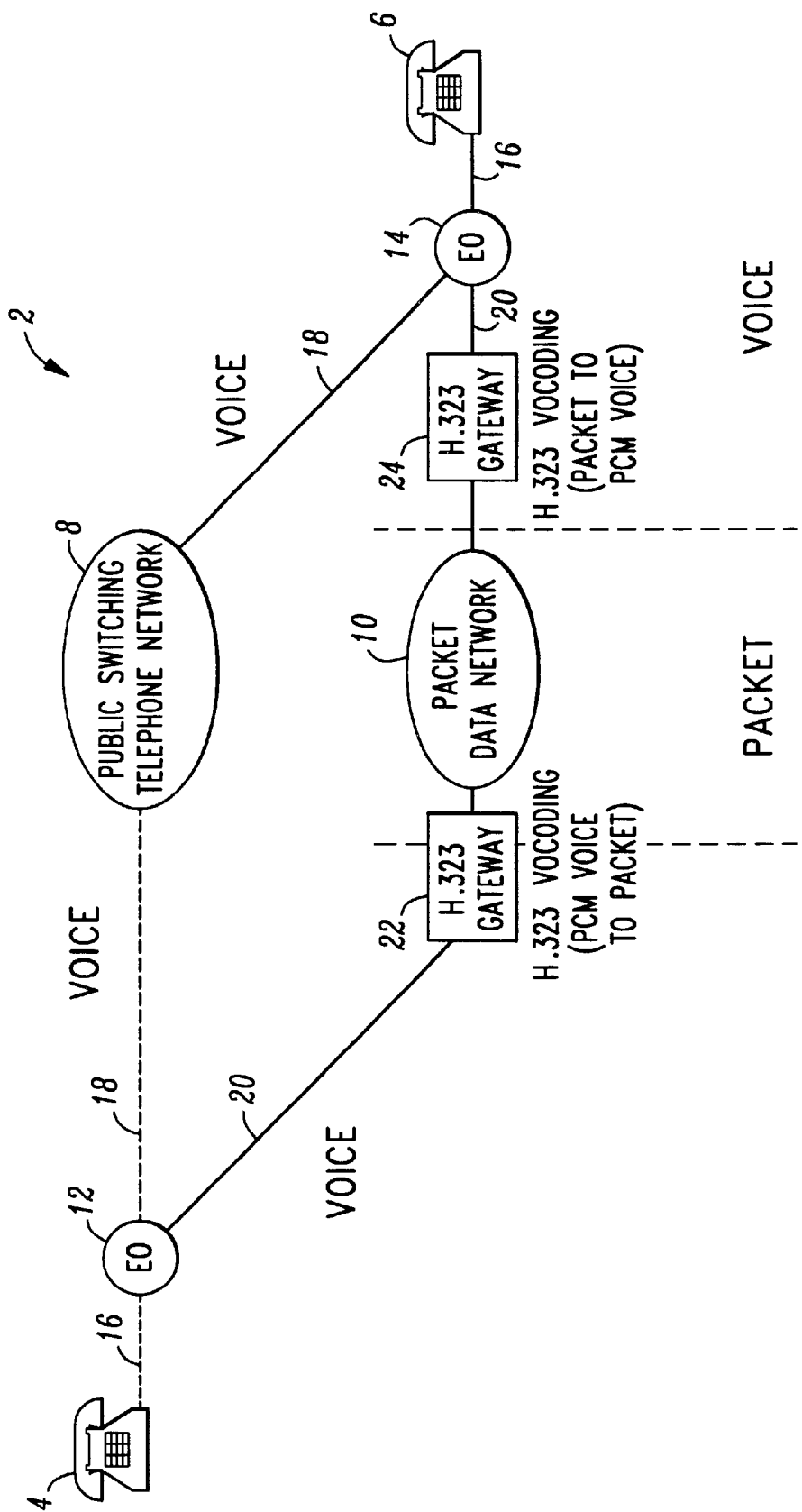
FIG. 1 is a block diagram showing relevant portions of an exemplary telecommunication system for routing telephone calls between wireline subscribers in the PSTN across an interconnected data network.

Turning now to the figures, wherein like reference numerals represent like elements in all of the several views, FIG. 1 illustrates an exemplary telecommunication system 2 for routing telephone calls between wireline subscriber units 4 and 6 in a PSTN 8 across an intermediate data network 10 implementing a network layer protocol, such as IP, or a link layer protocol such as ATM, or both. The PSTN 8 includes EOs 12 and 14 that serve the wireline subscriber units 4 and 6, respectively. Each EO 12 and 14 is connected via a conventional local loop subscriber line 16 to a respective one of the wireline subscriber units 4 and 6. As is known, the subscriber lines 16 would be typically implemented using two-element twisted pair wires carrying analog information or basic rate ISDN (BRI) digital information, depending on the configuration of the wire line subscriber units 4 and 6. Communication between the PSTN 8 and the EOs 12 and 14 would typically utilize trunk groups 18 carrying PCM digital voice traffic on multiplexed channels at a primary rate of 1.544 Mbps (T1), 2.048 Mbps (E1), or better.

The PSTN 8 provides the normal call communication path between the wireline subscriber units 4 and 6. As shown in FIG. 1, it is also possible to bypass the PSTN 8 using the data network 10. There are many architectures that could be used to support VoIP (or VoATM) on behalf of the wireline subscribers 4 and 6. FIG. 1 illustrates one such architecture in which the EOs 12 and 14 are respectively connected via T1 or E1 trunk groups 20 to a pair of data network gateways 22 and 24. The gateways 22 and 24 reside as hosts on the data network 10. They provide VoIP (or VoATM) services on behalf of the wireline subscriber units 4 and 6 and other users (not shown) communicating over the data network 10.

During VoIP (or VoATM) communications between the wireline subscribers 4 and 6, PCM traffic is routed from the EOs 12 and 14 to the respective gateways 22 and 24 for routing across the data network 10. The usual intelligent network database resources (not shown) of the PSTN can be used to determine the routing of calls over the data network 10.

The 7R/E Toll-Tandem™ gateway system from Lucent Technologies Inc. represents one exemplary product that could be used to implement the gateways 22 and 24. The 7R/E Toll-Tandem™ gateway is built in accordance with the "H.323" specification, which is the recommended ITU protocol standard for real-time multimedia communications and conferencing over and across existing infrastructures such as LAN/WANs, the Internet or any other topology where IP/ATM communication is supported.

An H.323 gateway maintains compatibility with existing protocols for audio, video, and data translation, conversion and transfer, as well as media control and call signaling. Signaling is processed by a signaling gateway function (not shown) which can be either integrated with the H.323 gateway or provided by a separate element. An H.323 gateway supports functions such as voice compression, PSTN-to-IP protocol mapping, real-time facsimile modulation/demodulation, call signaling support, control channel messages, media control, multiplexing and audio transcoding. Each H.323 gateway further implements a protocol stack in which the above-described audio, video, data, control and signaling protocols are layered above the TCP or UDP transport layer, which itself sits above the network layer. IP encapsulation of non-IP formatted information is thus facilitated to enable routing across the IP network served by the H.323 gateway.

The default vocoding protocol for the H.323 is G.723.1 (or G.729). These are voice compression protocols in which lower bit rate sampling is used in comparison to the current 56 Kbps rate for PCM encoding used in the PSTN. Thus, when digital wireline frames are routed in FIG. 1 from the EOs 12 and 14 to the gateways 22 and 24, vocoding is typically performed in the gateways in accordance with the G.723.1 or G.729 compression standard. Other vocoding protocols supported by H.323 are G.722, G.728 and the G.711 standard.

Figure 2:
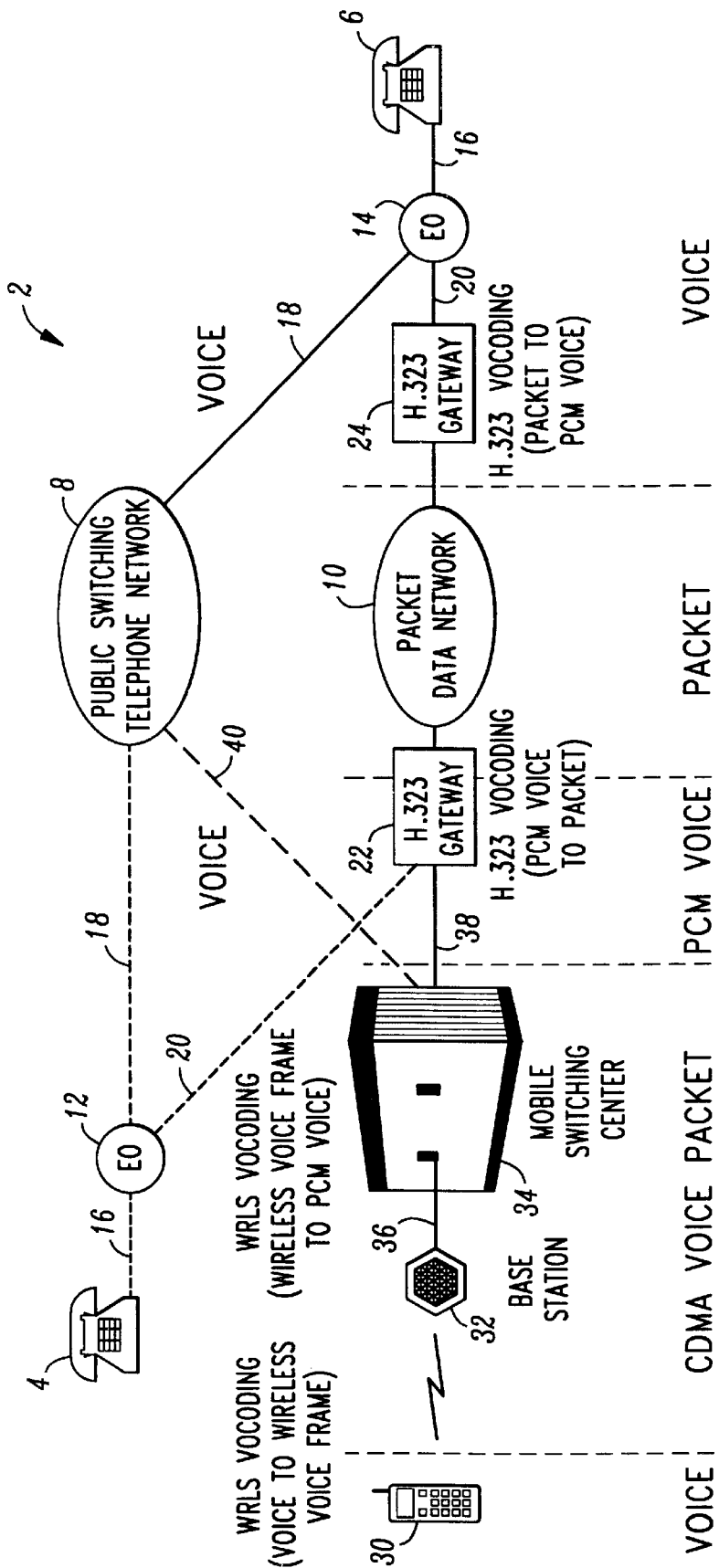
FIG. 2 is a block diagram showing a first exemplary telecommunication system for routing telephone calls from a wireless subscriber to a wireline subscriber in the PSFN across an interconnected data network.

If it is desired to implement VoIP (or VOATM) routing for wireless voice communication across the data network 10, the topology shown in FIG. 2 could be used. This topology essentially reuses the architecture implemented for the wireline environment of FIG. 1, and includes the gateways 22 and 24 providing the above-described H.323 gateway functions at both ends of the data network 10. A mobile radio unit 30, which is assumed to be a cellular telephone or personal communication system (PCS) device, communicates with a cell base station 32. It is further assumed that the radio unit 30 is a digital device that includes a wireless-specific vocoder for converting analog voice input into digital wireless frames, By way of example, the input information could be converted into digital wireless frames using a TDMA-specific vocoding standard such as the Algebraic Code Excited Linear Predictive (ACELP) algorithm, or a CDMA-specific standard such as the Enhanced Variable Rate Codec (EVRC) algorithm. A GSM vocoding algorithm could also be used.

As is known in the art, the above-described digital wireless frames typically include an information field containing speech coder bits (also known as a vector or codeword) corresponding to a voice sample of fixed duration (e.g., a 20 ms voice sample). The speech coder bits may be followed by an error correction field containing error correction bits. These fields are typically appended and/or prepended with additional physical framing bits to form composite frames. Persons skilled in the art will appreciate that the term "frame" is sometimes used in a somewhat different sense to refer to a repeating sequence of logical channels (e.g., time slots) assigned to multiple mobile units, with each logical channel (or a channel pair) containing the above-described bit fields for a specific mobile unit. To avoid ambiguity, the term "digital wireless frame" will be understood to represent an information unit containing at least the above-described information field containing speech coder bits (or bits that encode other forms of real-time information input, such as multimedia), and which may also include additional overhead bits, such as the above-described error correction bits and physical framing bits.

The digital wireless frames generated by the radio unit 30 are received at the base station 32 and routed via a broadband pipe 36 (carrying digital wireless frames for multiple radio units) to a mobile switching center 34. A second wireless-specific vocoding operation is performed in the mobile switching center 34 (if not previously performed at the base station 32) to decode the digital wireless frames and recover the voice information carried therein. If an ECC field is present, it is processed (prior to vocoding) using an appropriate error correction algorithm (e.g., a cyclic error control code or the like). The received information is converted to the usual PCM digital wireline format, and the resultant PCM traffic is placed onto a trunk for routing to the gateway 22.

For non-VoIP (or VoATM) applications, the PCM traffic would be routed to the PSTN 8 via the trunk group 40. For VoIP or VoATM applications, the PCM traffic is routed to the gateway 22. As previously described, a third vocoding step (compression) would ordinarily be performed at the gateway 22 (if the H.323 protocol is used) in order to convert the uncompressed PCM traffic into a compressed, low bit rate coding format in accordance with a protocol such as G.723.1 or G.729. A fourth vocoding step (uncompression) would then be performed at the gateway 24 to convert the compressed PCM traffic back to its uncompressed format. Thus, a total of four vocoding steps would be performed by the time the voice information originally input to the mobile radio unit 30 leaves the gateway 24. If the subscriber unit 6 is a wireline device, no further vocoding would be required. If, however, the subscriber unit 6 were a wireless device, two additional vocoding steps would be required, one at a BS or MSC (not shown) that supports the subscriber unit 6, and the other in the subscriber unit 6 itself.

These many vocoding steps could result in potential performance and quality issues. For example, if it is assumed that there is a 115 msec. delay in the radio access network formed by the radio unit 30, the base station 32 and the mobile switching center 34 (due in part to the two wireless-specific vocoding operations), a 40 to 100 msec. delay between the gateways 22 and 24 (depending on compression vocoding operations, the distance between both gateways, packet data and system buffering size, etc.), and a less than 10 msec. delay in the wireline access network formed by the EO 14 and the subscriber unit 6, then the total delay would be about 165 to 225 msec. Based on a history of mobile operational studies, a one-way transmission delay of zero is rated as "Good" voice quality, and a delay of 250 msec. is rated as "Fair" voice quality. Therefore, a wireless VoIP or (VoATM) call in the telecommunication system of FIG. 2 should be expected to exhibit better than Fair quality, but not Good quality. A longer delay (270 to 330 msec) could occur for mobile-to-mobile VoIP (or VoATM) calls because another 115 msec for vocoding delay, instead of the 10 msec wireline delay, is added to the total delay duration.

In order to improve communication performance and quality, it is proposed that the telecommunication system of FIG. 3 be implemented to optimize the wireless VoIP (or VoATM) application. In FIG. 3, wireless-specific vocoding is performed in the call originating radio unit 30 as usual. However, the wireless-specific vocoding normally performed at the mobile switching center 34 (or the base station 32) to convert the digital wireless frames received from the radio unit 30 into PCM traffic is eliminated. Instead, the digital wireless frames are placed directly onto the trunk 38 (with appropriate segmentation and multiplexing being performed as necessary to accommodate multiple users) and routed from the mobile switching center 34 to the gateway 22. The gateway 22 will be referred to hereinafter as the originating-end gateway.

At the originating-end gateway 22, the digital wireless frames are received from the trunk 38. However, the vocoding compression operation normally performed at the originating-end gateway 22 is eliminated, and the digital wireless frames are encapsulated within network packets (e.g., IP or ATM packets) for transport across the data network 10.

The network packet-encapsulated digital wireless frames are then routed across the data network 10 from the originating-end gateway 22 to the gateway 24, which will be referred to as the terminating-end gateway. At the terminating-end gateway 24, the digital wireless frames are unencapsulated from the network packets. It is then that a second wireless-specific vocoding operation is performed (preferably by the gateway 24) to convert the digital wireless frames into PCM traffic.

The PCM traffic output by the terminating-end gateway 24 is routed across the trunk 20 to the EO 14, which serves as a terminating EO on behalf of the subscriber unit 6, representing the call terminating unit. At the EO 14, the PCM traffic is either routed in digital form to the terminating unit 6, if it is a digital device, or converted to analog form, if the terminating unit 6 is an analog device, such as a telephone. Alternatively, if the terminating unit is a mobile radio unit, an MSC (not shown) would be substituted for the EO 14.

The telecommunication system of FIG. 3 provides improved performance and quality because double vocoding in the mobile switching center 34 (or the base station 32) and the originating-end gateway 22 is eliminated. The digital wireless frames generated by the radio unit 30, which are in a compressed format, are carried over the data network 10 without further encoding or decoding until they reach the terminating-end gateway 24 connected to the terminating EO 14. The digital wireless frames are only converted from their wireless-specific form at this gateway. Only two vocoding operations are thus required, one in the originating mobile radio unit 30 and the other at the terminating-end gateway 24. In a still further configuration, where the subscriber unit 6 is a digital radio unit implementing the same vocoding algorithm as the radio unit 30, it may be possible to defer the second vocoding step until the digital wireless frames reach this unit's vocoding circuit.

Although the digital wireless frames received at the mobile switching center 34 may be stripped of their physical framing bits, processed by error correction coding circuitry, and segmented and multiplexed for wireline transmission over the trunk 38, it will be appreciated by persons skilled in the art that none of operations constitutes "vocoding" or "encoding/decoding" as described herein. Such operations are relatively easy to perform and require significantly less time to implement than either the wireless-specific vocoding operation normally performed at the mobile switching center 34 (or the base station 32), or the vocoding compression operation normally performed at the originating gateway 22.

Insofar as a wireless-specific vocoding algorithm needs to be negotiated and implemented at the radio unit 30 and the terminating-end gateway 24 (in accordance with the preferred embodiment), the terminating-end gateway 24 needs to be conventionally programmed to execute such negotiation and implement the vocoding algorithm itself. In order to negotiate the vocoding algorithm, the terminating gateway 24 could be linked to the existing network signaling system (i.e., the SS7 network) of the PSTN 8. This linkage could be either a direct connection from the terminating gateway 24 to the SS7 network infrastructure, or an indirect connection via an H.323 gatekeeper (not shown). As will be understood by persons skilled in the art, these signaling connections will normally already exist in order to implement the traffic connections and call management required to set up and maintain the VoIP (or VoATM) call. To execute the wireless-specific vocoding algorithm, the existing vocoding negotiation capability of the terminating gateway 24 (used for vocoding negotiation with other gateways) can be expanded to encompass one or more wireless-specific algorithms, such as ACELP or EVRC. Other wireless vocoding schemes, such as those implemented in accordance with the GSM standard, could also be used.

Accordingly, a method for optimizing wireless communications routed across plural interconnected networks has been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a telecommunication system for routing real-time information traffic from an originating digital radio unit served by an originating network to a terminating unit served by a terminating network, via an intermediate network interconnecting said originating network and said terminating network, the originating digital radio unit having an encoder/decoder for generating digital wireless frames from information that is input thereto, said originating network having an originating node with an encoder/decoder for converting said digital wireless frames to digital wireline traffic, and said intermediate network including an originating-end interface node with an encoder/decoder for converting said digital wireline traffic into compressed digital wireline traffic, a method for optimizing communications routed between the originating and terminating units, comprising:

routing said digital wireless frames without wireless-specific conversion to digital wireline traffic at said originating node of said originating network, whereby the rate of information traffic throughput from said originating unit to said terminating unit is increased;

said intermediate network including a terminating-end interface node and said terminating network including a terminating node connected to said terminating unit, and;

wherein said terminating-end interface node of said intermediate network:

receives said digital wireless frames from said originating-end interface node of said intermediate network;

performs wireless-specific conversion to convert said digital wireless frames to digital wireline traffic; and routes said digital wireline traffic to said terminating node in said terminating network.

2. A method in accordance with claim 1 wherein said originating unit is a cellular telephone transmitting voice information that has been vocoded using a TDMA-specific, CDMA-specific, or GSM-specific vocoding algorithm.

3. A method in accordance with claim 1 wherein said originating network is a circuit-switched telephone network and said originating node in said originating network is a mobile switching center or a base station-mobile switching center combination serving said originating digital radio unit.

4. A method in accordance with claim 1 wherein said intermediate network is a computer data network, wherein said originating-end and terminating-end interface nodes in said intermediate network are network gateways, and wherein said digital wireless frames are routed as datagram packets across said intermediate network.

5. A method in accordance with claim 1 wherein said terminating node in said terminating network is either an end office or a mobile switching center serving said terminating unit.

6. A method in accordance with claim 1 wherein said digital wireline traffic comprises Pulse Code Modulated (PCM) information.

7. In a telecommunication system for routing real-time information traffic between an originating digital radio unit served by a first network across an interconnected second network to a terminating unit served by a third network, which may be the same as said first network, a method for optimizing communications routed between the originating and terminating units, comprising:

receiving digital wireless frames generated by said originating unit at a first node in said first network;

routing said digital wireless frames from said first node in said first network to a first node in said second network;

routing said digital wireless frames from said first node in said second network to a second node in said second network; and decoding said digital wireless frames into digital wireline traffic at said second node in said second network for transport to said terminating unit via a first node in said third network.

8. A method in accordance with claim 7 wherein said terminating unit is a wireline unit.

9. A method in accordance with claim 8 wherein said terminating unit is a wireless unit.

10. A method in accordance with claim 9 wherein said first and third networks comprise a single switched telephone network and said digital wireless frames are first received from said originating unit at a cellular base station in said first network and then routed to a mobile switching center constituting said first node in said first network.

11. A method in accordance with claim 7 wherein said digital wireless frames comprise voice information that is encoded using a TDMA-specific vocoding algorithm.

12. A method in accordance with claim 7 wherein said digital wireless frames comprise voice information that is encoded using a CDMA-specific vocoding algorithm.

13. A method in accordance with claim 7 wherein said digital wireless frames comprise voice information that is encoded using a GSM-specific vocoding algorithm.

14. A method in accordance with claim 7 wherein said digital wireline traffic comprises Pulse Code Modulated (PCM) information.

15. A method in accordance with claim 7 wherein said second network is a computer data network, said first and second nodes in said second network are data network gateways, and said digital wireless frames are routed as Internet Protocol (IP) packets or Asynchronous Transfer Mode (ATM) packets across said second network.

16. A method in accordance with claim 15 wherein said first node in said first network is a mobile switching center and is co-located with said first node in said second network to provide an originating mobile wireless gateway.

17. A method in accordance with claim 16 wherein said terminating unit is a digital radio unit, and wherein said first node in said third network is a mobile switching center and is co-located with said second node in said second network to provide a terminating mobile wireless gateway.

18. A method in accordance with claim 7 wherein said first network is a telephone network and said originating unit is a cellular telephone transmitting voice information that is vocoded using a TDMA-specific, a CDMA-specific, or a GSM-specific vocoding algorithm.

19. In a telecommunication system including (1) a telephone network having a first mobile switching center serving an originating digital mobile radio unit and a second switching center serving a terminating wireless or wireline unit, and (2) a data network having a first gateway interconnected to the first mobile switching center and a second gateway interconnected to the second switching center, a method for optimizing the routing of voice or other real-time information traffic between the originating digital mobile radio unit across the data network to the terminating wireline or wireless unit, comprising the steps of:

receiving digital wireless frames from the originating mobile wireless unit at the first mobile switching center;

placing said digital wireless frames onto a trunk and routing them from the first mobile switching center to the first gateway;

encapsulating said digital wireless frames within network datagram packets and routing said encapsulated digital wireless voice packets from the first gateway to the second gateway across the data network;

unencapsulating said digital wireless frames at said second gateway and converting said digital wireless frames into Pulse Code Modulated (PCM) digital wireline traffic;

placing said PCM traffic onto a trunk and routing it to said second switching center; and routing said PCM traffic, or analog traffic derived therefrom, to said terminating unit.

* * * * *